United States Patent [19]
Lawton

[11] 3,853,657
[45] Dec. 10, 1974

[54] BONDING OF POLY(ETHYLENE TEREPHTHALATE) INDUCED BY LOW-TEMPERATURE PLASMAS

[75] Inventor: Ernest L. Lawton, Durham, N.C.

[73] Assignee: Monsanto Company, St. Louis, Mo.

[22] Filed: Feb. 14, 1972

[21] Appl. No.: 225,764

[52] U.S. Cl............. 156/180, 156/272, 117/93.1 R, 204/165
[51] Int. Cl............................ B29h 9/02, B01k 1/00
[58] Field of Search ........... 156/272, 180, 305, 117, 156/110 C; 117/93.3, 93.31, 93.1; 204/165, 168, 159.19; 161/231, 412, 241; 250/531

[56] References Cited
UNITED STATES PATENTS

| | | |
|---|---|---|
| 3,057,792 | 10/1962 | Frohlich............................ 204/165 |
| 3,305,430 | 2/1967 | Hennemann..................... 161/231 X |
| 3,462,335 | 8/1969 | Hansen et al....................... 156/272 |
| 3,526,583 | 9/1970 | Hayward............................. 204/165 |
| 3,647,676 | 3/1972 | Bersin........................... 204/165 X |
| 3,661,735 | 5/1972 | Drelich ............................. 204/165 |
| 3,690,926 | 9/1972 | Wampetich et al............. 161/231 X |
| 3,723,289 | 3/1973 | Boom............................. 204/168 X |

Primary Examiner—Charles E. Van Horn
Assistant Examiner—M. G. Wityshyn
Attorney, Agent, or Firm—Thomas Y. Awalt, Jr.

[57] ABSTRACT

Bonding of polyester tire cord to rubber by conventional adhesive treatments is improved by pretreating the yarn or the cord by brief exposure to a non-oxidizing low temperature gas plasma.

6 Claims, 1 Drawing Figure

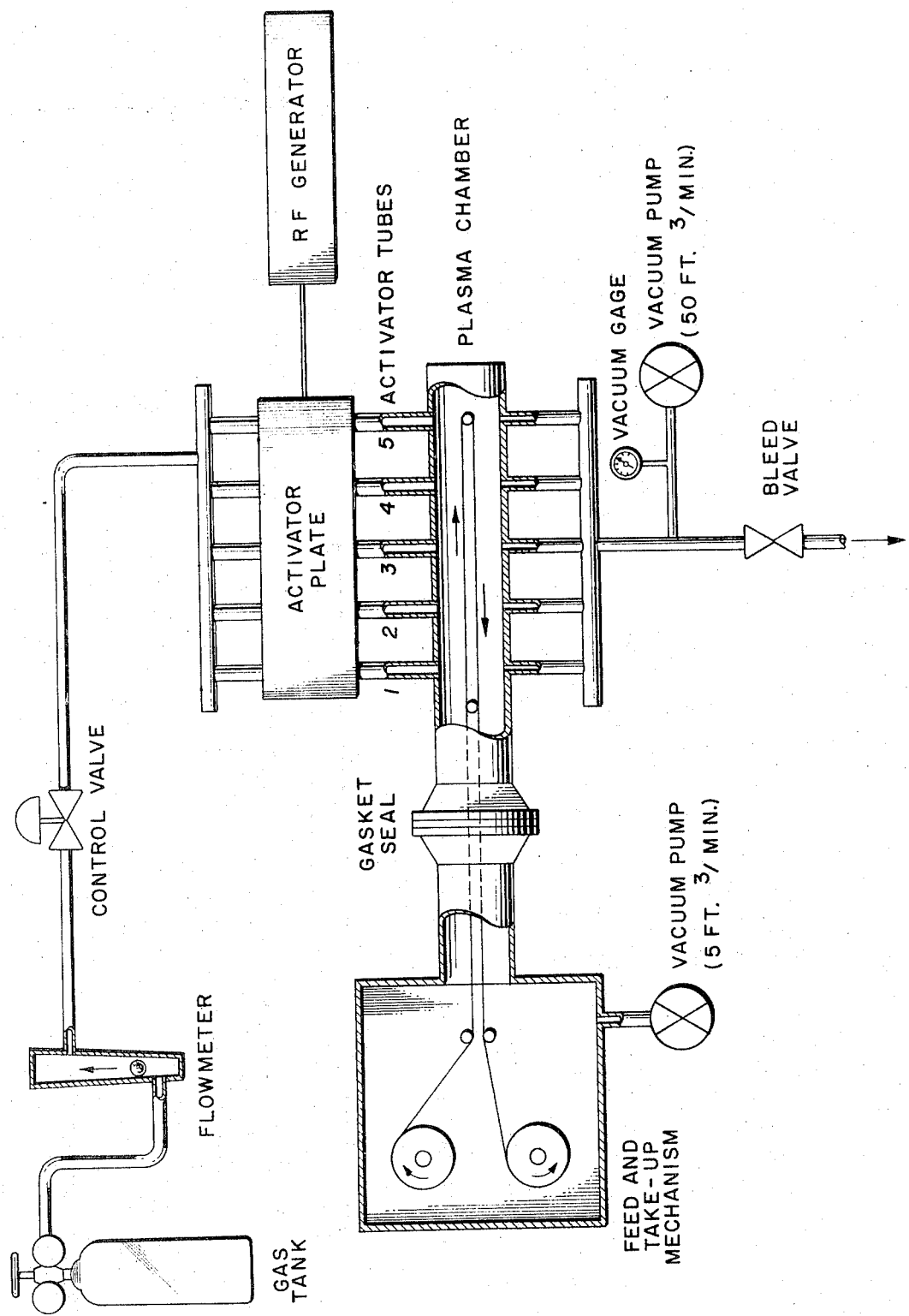

BONDING OF POLY(ETHYLENE TEREPHTHALATE) INDUCED BY LOW-TEMPERATURE PLASMAS

This invention relates to the service modification of polyethylene terephthalate fibers for the purposes of improving its bonding characteristics to rubber.

Extensive efforts have been made towards the improvement of the bonding characteristics of such textile materials as rayon, nylon and polyester, to polymeric materials because good adhesion is important to the manufacture of tires.

Adhesion between synthetic polymeric fibers had generally been accomplished by the use of resin-latex adhesives, such as resorcinolformaldhyde-latex adhesive (commonly known as RFL, or modifications thereof as described in U.S. Pat. Nos. 2,961,343; 2,561,215, and Re 23,451).

In the case of certain synthetic fibers, due to their suface characteristics, the resin-latex composition has generally not been satisfactory in holding the fiber side of the bind. In the case of polyester, other surface treating agents such as the isocyanate have been used in conjunction with the resin-latex composition, as a pretreatment for the fiber. Although this was satisfactory for the bonding of polyester tire cord or fabric to rubber, alternate methods were developed in order to avoid the use of the isocyanate. One of these alternates involved exposure to ionized gas. According to U.S. Pat. No. 3,477,902, the so-called "glow discharge" technique was used to activate gas for the pretreatment of fabrics, followed by conventional RFL bonding techniques. The "glow discharge technique," and other hi-energy discharges create an ionized gas which, when applied under certain conditions to a fiber or filament, will penetrate and alter its basic characteristics.

It is an object of this invention to provide a method for use in conjunction with the conventional tire adhesion compositions, to bond polyester tire cord to rubber.

It is another object of this invention to provide a physical surface electron bombardment treatment which does not cause penetration of fiber to such an extent as its properties would be altered.

Yet another object of this invention is to provide an adhesive system for tire cord which permits lower curing temperatures for the adhesive without sacrificing the levels of adhesion obtained on untreated cord at higher temperatures of cure.

Briefly, the objects of this invention are attained in a process for bonding of polyester cords to rubber by exposing the polyester yarn to non-oxidizing low temperature gas plasma at a pressure of not more than about 2 torrs and a concentration of electrons of about $10^{10}$–$10^{13}$ per cubic centimeters, for a period of at least about 1 second, before plying the yarn into cord. Without any further exposure of the cord to heat, the cord is then dipped in a resin-latex adhesive and subsequently cured. Alternatively, the yarn may be plied into cord, and the cord may then be treated in the low temperature plasma. As compared with chemical, thermal, or radiation modifications of polymer surfaces, the radio-frequency "low-temperature" plasma is unique in that the bulk of the polymer is not penetrated and bulk properties such as color, tensile strength, elongation, and dielectric constant are not altered.

In the description, reference will be made to the attached drawing in which the FIGURE is a schematic representation of yarn or cord treating process.

In the Figure, gas flows from the gas tank through the flow meter and control valve to the activator tubes. The generator is a 300 watt 13.56 $M_c$ radio frequency generator. There are no electrodes. Activator plates are in conjunction with a pyrex glass chamber and five activator tubes charge the gas. The gas employed may be active or inactive, but oxidizing plasmas such as oxygen and air are least effective since they continually remove measurable quantities of material from the polymer surface. Thus the use of plasma such as oxygen may result in a weak surface layer containing partially oxidized polymer chains.

The "low temperature" oxygen plasma consists of 10–20% atomic oxygen in a similar quantity of excited oxygen molecules. The oxygen molecules are excited from a triplet ground state to a spectroscopically excited first singlet. The following species have been identified in RF oxygen plasmas: $O+,O_2+,O-$, $O_2-,O(3P), O_2(^1\Delta g)$, and free electrons. The concentration of ions and electron will vary from $10^{10}$ to $10^{13}$ per cubic centimeter depending on the electric field strength, pressure, impurities (including reaction products such as $CO_2$ from organic substrate) and wall effects. The concentration of the neutral species will vary from $10^{15}$ to $10^{16}$ per cubic centimeters. Ultraviolet emissions may also occur.

At a radio freqeuncey radiation of less than 1,000 Mc/ second in a gas that is in the 1 torr pressure range, the interaction will result in the ionized gas described above. Outside the region of activation, the ions will rapidly recombine with the electrons; but other species may persist. The translational temperature of neutral species in typical low-pressure plasma is approximately room temperature. The electrons within the "low-temperature" plasma have sufficient kinetic energy for their temperature to be of the order of tens of thousands of °K but their mass is too small for them to penetrate organic solids which they impinge on. The ionized species (about 0.01 percent of plasma) have translational vibration, and rotational temperatures that are slightly higher than neutral species due to their ability to extract energy directly from the electrical field. At higher pressures, temperature equilibrium is obtained between the electrons and atomic, molecular and ionic species resulting in the more familiar "high temperature" plasmas.

EXAMPLES

Bundles of 1,000 denier/200 filament polyethylene terephthalate fibers were processed thorugh a commercially available Tracer Laboratories LTA–600 plasma generator, modified as shown in the drawing. Exposure to the plasma was under a pressure of 0.5±0.1 torr for a period of 9.4 seconds. Flow rate of each gas was adjusted to achieve the 0.5 torr pressure in the plasma chamber. The flow rate varied from 20 to 40 cubic centimeters per minute depending on the gas employed. After the fiber bundles were removed from the plasma chamber, they were twisted into a 2 ply (1,000 denier per ply) at 12 turns per inch Z twist end singles and 12 turns per inch S twist in the ply. Adhesives were applied as indicated and the rubber-to-cord adhesion was tested as indicated below. Three commercially available adhesives were employed. The first was a standard RFL dip prepared by dissolving 5.5 grams of resorcinol in 116 milimeters of water containing 0.15 grams of sodium hydroxide. To this solution, 8.1 grams of 37 weight percent aqueous formaldehyde was added; and the solution was stirred for 5 minutes. This resin master solution was allowed to age for 6 hours at 75°-78°F. The 133 grams of resin master was added to a dispersion of 122.0 grams of polyvinyl-pyridine-styrene-butadiene latex (41 weight percent solids) and 30.0 grams of deionized water, the resulting dispersion being mixed for 15 minutes. The RFL dip was used within 72 hours.

Another dip consisting of a commercially available proprietary dip known as H7(Imperial Chemical Industries Limited) was employed for purposes of comparison. This dip consisted of 82 milliliters of H-7 adhesive, 50 milliliters of polyvinyl-pyridine-styrene-butadiene latex (41 weight percent solids), and 72 milliliters of deionized water.

In each case the cord was dipped in the adhesive and passed through a 6 foot drying zone maintained at 165°C., then into an electrically heated circulating hot-air oven.

A third dip employed was the isocyanate-epoxy adhesive known as D417, (duPont) more particularly described in U.S. Pat. No. 3,307,966.

The cured cord was tested for static adhesion at 120°C. in the H-pull test as described in ASTM D-2138-67, except that three-sixteenths inch rather than one-quarter inch of cord was pulled from the rubber.

The peeling adhesion of 1 by 6 inch strips of a rubber cord composite [cord/adhesives/rubber (2 ply, 1,000/2 cord 48n/inch)] was tested at 120°C. The construction of these strip adhesion samples was in accordance with the "modified strip adhesion method" presented to the ASTM sub committee A-9 by J. L. Brownlee on Oct. 17, 1962. A sample of rubber having 2 parallel plys of cord is pulled apart at a rate of 12 inches per minute at an angle of 180°, and the peel force averaged for a 2 inch length of peel. Plys are constructed with the closest possible spacing of cords. Skim stock between plys was 15–20 mils.

The rubber used in H-block and strip samples reflected a Moony Scorch time (5 point rise/135°C.) as 13.5 minutes. All samples had a cure time of 20 minutes at 153°C., and had been subjected in block molds to 500 lbs. per square inch pressure at 300°F. for 25 minutes.

Pull loads listed in the tables are average values from 8H-blocks. Peeling loads are average values from five strips from a single mold.

The following table illustrates the improvement in adhesion obtained by these treatments. It was discovered that so far as polyethylene terephthalate is concerned, the oxidizing plasmas, oxygen and air are the least effective, suggesting the possibility of actual oxidation of the surface layer of the fiber.

TABLE 1

EFFECT OF GAS ON ADHESION IMPROVEMENT

| Adhesive | Cure Conditions | Strip Adhesion Peeling Load (lb./in.) at 120°C. | | | | | | | |
|---|---|---|---|---|---|---|---|---|---|
| | | $N_2$ | $N_2$ | A | He | $NH_3$ | Air | $O_2$ | Control |
| RFL | 210°C., 3 min. | 16.9 | 15.3 | 14.5 | 11.5 | 21.0 | — | 7.5 | 2.5 |
| RFL | 232°C., 3 min. | 18.6 | 17.5 | 10.6 | 15.0 | 23.7 | 14.1 | 11.2 | 3.0 |
| RFL | 232°C., 3 min. | | | 17.0 | | | | | 2.0 |
| H7 | 243°C., 3 min. | | | 19.0 | | | | | 16.0 |
| D417 | 230°C., 1 min. | | | | | | | | |
| | 204°C., 1 min. | 22.8 | | | | | | | 20.0 |

| Adhesive | Cure Conditions | Visual Estimate of % of Cord Covered by Rubber After Peeling Test | | | | | | | |
|---|---|---|---|---|---|---|---|---|---|
| | | $N_2$ | $N_2$ | A | He | $NH_3$ | Air | $O_2$ | Control |
| RFL | 210°C., 3 min. | 30 | 40 | 40 | 25 | 90 | — | 10 | 0 |
| RFL | 232°C., 3 min. | 50 | 75 | 10 | 50 | 98 | 20 | 40 | 0 |
| RFL | 232°C., 3 min. | | | 80 | | | | | 0 |
| H7 | 243°C., 3 min. | | | 98 | | | | | 90 |
| D417 | 230°C., 1 min. | | | | | | | | |
| | 204°C., 1 min. | 100 | | | | | | | 100 |

| Adhesive | Cure Conditions | H-Block Pull Load (lb.) at 120°C. | | | | | | | |
|---|---|---|---|---|---|---|---|---|---|
| | | $N_2$ | $N_2$ | A | He | $NH_3$ | Air | $O_2$ | Control |
| RFL | 210°C., 3 min. | 13.9±1.8 | 13.1±1.9 | 15.6±0.7 | 11.7±1.1 | 9.5±0.9 | — | 10.6±0.7 | 7.5±0.3 |
| RFL | 232°C., 3 min. | 17.0±1.8 | 16.6±1.8 | 13.8±1.2 | 13.9±0.9 | 10.7±1.7 | 11.4±1.8 | 12.3±0.6 | 8.6±0.7 |
| RFL | 232°C., 3 min. | | | 15.8±1.2 | | | | | 8.0±1.2 |
| H7 | 243°C., 3 min. | | | 17.7±0.6 | | | | | 13.5±1.3 |

The above described plasma-treatment was applied to tire cords of 1,000 denier per ply/2 ply construction. Cord was passed through the various plasmas at 1.0±0.14 pressure for a 9.4 second exposure time.

TABLE 2

PLASMA TREATMENT OF CORD

| Adhesive | Cure Conditions | Strip Adhesion Peeling Load (lb./in.) at 120°C. | | | |
|---|---|---|---|---|---|
| | | $N_2$ | $O_2$ | $(1)_O (2)_N$ | Control |
| RFL | 230°C., 3 min. | 11.6 | | | 5.0 |
| H7 | 200°C., 3 min. | 20.8 | | | 15.7 |
| H7 | 230°C., 3 min. | 16.8 | 19.6 | 20.4 | 17.9 |
| RFL | 230°C., 3 min. | | 18.3 | 16.0 | 12.2 |

TABLE 2—Continued

PLASMA TREATMENT OF CORD

| Adhesive | Cure Conditions | Strip Adhesion Peeling Load (lb./in.) at 120°C. | | |
|---|---|---|---|---|
| H7 | 200°C., 3 min. | 22.5 | 23.9 | 16.0 |
| | | Visual Estimate of % of Cord Covered by | | |
| Adhesive | Cure Conditions | Rubber after Peeling Test | | |
| | | $N_2$ $O_2$ $(1)_O$ $(2)_N$ | | Control |
| RFL | 230°C., 3 min. | 50 | | 0 |
| H7 | 200°C., 3 min. | 100 | | 100 |
| H7 | 230°C., 3 min. 100 | 100 100 100 | | |
| RFL | 230°C., 3 min. | 25 5 | | 20 |
| H7 | 200°C., 3 min. | 100 100 | | 20 |

In the third column a two stage treatment of 9 seconds each exposure to oxygen plasma and nitrogen plasma is shown.

Bundles of 1,000 denier/200 filament polyethylene terephthalate fibers were subjected to nitrogen plasma at a pressure of 0.5 torr for varying exposure times at a forward power level at 100 watts. Exposure time was adjusted by controlling the takeup speed of the fiber bundle passing through the plasma chamber. The three tests reflect questionable adhesion improvement beyond 4 seconds exposure time. There are two curing temperatures shown. In each case the cord was held at constant length for 3 minutes during curing.

TABLE 3

EFFECT OF EXPOSURE TIME TO PLASMA ON ADHESION IMPROVEMENT

| Exposure Time | Strip Adhesion Peeling Load | | Visual Estimate of % of | | H-Block Pull Load | |
|---|---|---|---|---|---|---|
| (sec) | (lb./in.) at 120°C. | | Cord Covered by Rubber | | (lb.) at 120°C. | |
| | RFL-210°C. | RFL-230°C. | RFL-210°C | RFL-230°C. | RFL-210°C. | RFL-230°C |
| 0 | 2.5 | 3.0 | 0 | 0 | 7.5±0.3 | 8.6±0.7 |
| 4.3 | 22.3 | 22.9 | 90 | 98 | 10.7±1.7 | 15.7±1.8 |
| 9.6 | 16.9 | 18.6 | 30 | 40 | 13.9±1.8 | 17.0±1.8 |
| 34.0 | 15.4 | 18.4 | 10 | 80 | 14.8±0.8 | 10.4±1.5 |

Since better adhesion of the tire cord to rubber can ordinarily be obtained by increasing the curing temperature of most adhesives, and since high curing temperatures have a tendency to cause degradation of the polyester cord, utilization of the process of this invention permits a lowering of curing temperature without sacrifice of adhesion levels which would otherwise be obtained for the untreated cord at the higher temperatures. This is illustrated by Table 4 below which shows, for example, that equivalent adhesion can be obtained with the H-7 adhesive at temperatures 30° lower by means of the application of the instant invention.

We claim:

1. A treatment for filaments derived from a long chain synthetic polymer composed of at least 85 percent by weight of an ester of dihydric alcohol and terephthalic acid comprising exposing the surface of a fiber for a period of at least about 1 second to a more low temperature gas plasma at a pressure of not moe than about 2 torr and a concentration of electrons of about $10^{10}$–$10^{13}$ per cubic centimeter, whereby bondability of the filament to rubber with resin-latex adhesives is substantially improved without alteration of bulk properties of said filament.

2. The process of claim 1 wherein the polyester filaments are in the form of filament bundles of a total denier of about 500–1,5000 when treated with gas plasma.

3. The process of claim 1 wherein the polyester filaments are in the form of tire cords when treated with gas plasma.

4. In a process for bonding cords to rubber, a substantial portion which cords consist of filaments derived from a long chain synthetic polymer composed of at least 85 percent by weight of an ester of a dihydric alcohol and terephthalic acid, wherein said individual filaments in the form of yarns are plied into a cord and therafter dipped into a resin-latex adhesive and subsequently cured, the improvement comprising exposing

TABLE 4

EFFECT OF CURING TEMPERATURE AND TIME ON ADHESION IMPROVEMENT

| Adhesive | Temperature (°C) | Time (min.) | Strip Peeling Load (lb./in.) at 120°C. | | Visual Estimate of % of Cord Covered by Rubber | |
|---|---|---|---|---|---|---|
| | | | treated | Control | treated | Control |
| RFL | 210 | 1 | 12.3 | 2.4 | 30 | 0 |
| RFL | 210 | 3 | 13.2 | 3.3 | 60 | 0 |
| RFL | 210 | 6 | 17.3 | 6.3 | 85 | 0 |
| RFL | 200 | 3 | 12.8 | 3.1 | 50 | 0 |
| RFL | 210 | 3 | 13.2 | 3.3 | 60 | 0 |
| RFL | 220 | 3 | 15.1 | 3.9 | 80 | 0 |
| RFL | 230 | 3 | 16.7 | 5.0 | 70 | 0 |
| H7 | 200 | 3 | 17.9 | 15.7 | 100 | 100 |
| H7 | 230 | 3 | 20.1 | 17.9 | 100 | 100 |
| | 230 | 1 | 22.8 | 20.0 | 100 | 100 |
| D417 | 204 | 1 | | | | | the fibers to a non-oxidizing low temperature gas plasma at a pressure of not more than about 2 torr at a concentration of electrons of about $10^{10}-10^{13}$ per cubic centimeter for a period of at least about 1 second before dipping into said resin-latex adhesive.

5. The processing improvement of claim 4 wherein the fibers are in the form of yarn when exposed to the gas plasma.

6. The process improvement of claim 4 wherein the fibers are in the form of cord when exposed to the gas plasma.

* * * * *

UNITED STATES PATENT OFFICE
CERTIFICATE OF CORRECTION

PATENT NO. : 3,853,657
DATED : December 10, 1974
INVENTOR(S) : E. L. Lawton

It is certified that error appears in the above-identified patent and that said Letters Patent are hereby corrected as shown below:

Claim 1, line 5, "more" should read ---non-oxidizing---;

line 6, "moe" should read ---more---;

Claim 2, line 3, "1,5000" should read ---1500---.

Columns 4 and 5, Table 2 should read as shown on the attached sheets.

Signed and sealed this 10th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

PATENT NO. : 3,853,657
DATED : December 10, 1974
INVENTOR(S) : E. L. Lawton

It is certified that error appears in the above-identified patent and that said Letters Patent are hereby corrected as shown below:

Col. 4, Table 2, read ---

TABLE 2

PLASMA TREATMENT OF CORD

| Adhesive | Cure Conditions | Strip Adhesion Peeling Load (lb./in.) at 120°C. | | | | |
|---|---|---|---|---|---|---|
| | | $N_2$ | $O_2$ | $(1)_{O_2}$ | $(2)_{N_2}$ | Control |
| RFL | 230°C., 3 min. | 11.6 | | | | 5.0 |
| H7 | 200°C., 3 min. | 20.8 | | | | 15.7 |
| H7 | 230°C., 3 min. | 16.8 | 19.6 | 20.4 | | 17.9 |
| RFL | 230°C., 3 min. | | 18.3 | 16.0 | | 12.2 | should read

TABLE 2

PLASMA TREATMENT OF CORD

| Adhesive | Cure Conditions | Strip Adhesion Peeling Load (lb./in.) at 120°C. | | | | |
|---|---|---|---|---|---|---|
| | | $N_2$ | $O_2$ | $(1)_{O_2}$ | $(2)_{N_2}$ | Control |
| RFL | 230°C., 3 min. | 11.6 | | | | 5.0 |
| H7 | 200°C., 3 min. | 20.8 | | | | 15.7 |
| H7 | 230°C., 3 min. | 16.8 | 19.6 | 20.4 | | 17.9 |
| RFL | 230°C., 3 min. | | 18.3 | 16.0 | | 12.2 |

UNITED STATES PATENT OFFICE
CERTIFICATE OF CORRECTION

PATENT NO. : 3,853,657
DATED : December 10, 1974
INVENTOR(S) : E. L. Lawton

PAGE - 3

It is certified that error appears in the above-identified patent and that said Letters Patent are hereby corrected as shown below:

Col. 5, Table 2 - Continued, read ---

TABLE 2—Continued

PLASMA TREATMENT OF CORD

| Adhesive | Cure Conditions | Strip Adhesion Peeling Load (lb./in.) at 120°C. | | |
|---|---|---|---|---|
| H7 | 200°C., 3 min. | 22.5 | 23.9 | 16.0 |

| Adhesive | Cure Conditions | Visual Estimate of % of Cord Covered by Rubber after Peeling Test | | | |
|---|---|---|---|---|---|
| | | N₂ | O₂ | (1)O₂ (2)N₂ | Control |
| RFL | 230°C., 3 min. | 50 | | | 0 |
| H7 | 200°C., 3 min. | 100 | | | 100 |
| H7 | 230°C., 3 min 100 | 100 | 100 | 100 | |
| RFL | 230°C., 3 min. | | 25 | 5 | 20 |
| H7 | 200°C., 3 min. | | 100 | 100 | 20 | should read

TABLE 2 - Continued

PLASMA TREATMENT OF CORD

| Adhesive | Cure Conditions | Strip Adhesion Peeling Load (lb./in.) at 120°C. | | |
|---|---|---|---|---|
| H7 | 200°C., 3 min. | 22.5 | 23.9 | 16.0 |

| Adhesive | Cure Conditions | Visual Estimate of % of Cord Covered by Rubber after Peeling Test | | | |
|---|---|---|---|---|---|
| | | $N_2$ | $O_2$ | $(1)O_2$ $(2)N_2$ | Control |
| RFL | 230°C., 3 min. | 50 | | | 0 |
| H7 | 200°C., 3 min. | 100 | | | 100 |
| H7 | 230°C., 3 min. | 100 | 100 | 100 | 100 |
| RFL | 230°C., 3 min. | | 25 | 5 | 20 |
| H7 | 200°C., 3 min. | | 100 | 100 | 20 |